(12) United States Patent
Cheng

(10) Patent No.: US 7,636,474 B2
(45) Date of Patent: Dec. 22, 2009

(54) AUTOMATIC WHITE BALANCE CORRECTION METHOD FOR IMAGE CAPTURING APPARATUS

(75) Inventor: Nai-Sheng Cheng, Hsinchu (TW)

(73) Assignee: Fast Link Communication Corp., Taipei (TW)

( * ) Notice: Subject to any disclaimer, the term of this patent is extended or adjusted under 35 U.S.C. 154(b) by 679 days.

(21) Appl. No.: 11/494,498

(22) Filed: Jul. 28, 2006

(65) Prior Publication Data

US 2006/0274160 A1    Dec. 7, 2006

Related U.S. Application Data

(62) Division of application No. 10/323,767, filed on Dec. 20, 2002, now Pat. No. 7,162,078.

(51) Int. Cl.
*G06K 9/00* (2006.01)
(52) U.S. Cl. ...................................... 382/167; 382/162
(58) Field of Classification Search ................ 382/162, 382/166–167; 358/518, 522; 348/223.1
See application file for complete search history.

(56) References Cited

U.S. PATENT DOCUMENTS 6,069,972 A * 5/2000 Durg et al. ............... 382/167
6,956,967 B2 * 10/2005 Gindele et al. ............ 382/167

\* cited by examiner

*Primary Examiner*—Duy M Dang
(74) *Attorney, Agent, or Firm*—Rosenberg, Klein & Lee

(57) ABSTRACT

Disclosed is an automatic white balance method for image capturing apparatus. An image capturing apparatus captures a color image first and performs gray point searching in RGB color space or YUV color space. The color correction coefficient sets of red color, green color and blue color components of each gray points are computed respectively, and then the color correction coefficient sets of all the gray points are averaged to generate a color correction average value set. Each pixel of the color image is color-corrected in a color space according to the color correction average value set so as to obtain an optimum white balance effect. The present invention is beneficial for the reduction of design cost, downsizing of storage memory space, decrease of computation quantity and simplification of image-searching process.

12 Claims, 3 Drawing Sheets

AUTOMATIC WHITE BALANCE CORRECTION METHOD FOR IMAGE CAPTURING APPARATUS

This application is a Divisional patent application of application Ser. No. 10/323,767, filed on 20 Dec. 2002 now U.S. Pat. No. 7,162,078.

FIELD OF THE INVENTION

The present invention is related to an automatic white balance correction method for an image capturing apparatus, and more particularly to an automatic white balance correction method by using gray points to perform color correction.

BACKGROUND OF THE INVENTION

Digital color imaging technology has been widely used in various multimedia peripheral devices and image capturing apparatuses, for example, digital still camera, digital video recorder and so on. In some situations the color of an object itself will be different in accordance with the change of the color of incident light, however, human eye will adapt to the colors of incident light source quickly and automatically. Unfortunately, image capturing apparatus does not provide with the function of achieving natural color. To correct the color derivation resulting from source light and obtain more natural looking colors, a crucial element is typically used in digital color image processing applications, which is known as white balance technique.

The purpose of white balance correction is to allow the image capturing apparatus to function as human eyes, which automatically adjust internal color balance by calculating an average of different illuminations, such that the hue and tinge of white color can be actually displayed under all conditions. In other words, automatic white balance technique generally adjusts the intensities of three original colors—red, green and blue within the entire image according to computation result of the image properties in the present digital image frame, and thereby correct the color deviation resulting from external source light.

The conventional automatic white balance correction methodology normally uses white points to perform color image correction. An example of the conventional art is described in U.S. Pat. No. 6,069,972, which is incorporated herein for reference. The automatic white balance correction methodology suggested in this conventional art reference accomplishes a global search to the captured color image. After all the white points defining a color image have been searched out, an average of these white point component values is evaluated. Subsequently, the evaluated average is used to compute the color correction coefficients of the white point component values with respect to each pixel component values. Eventually, the computed color correction coefficients are used to perform color correction to each pixel components of the color image, and further automatically adjusting to obtain the most appropriate white balance.

However, in the above steps of white point searching, white point color correction coefficient computation and color correction, each step requires to search the entire color image, i.e. the brightest white point must be searched out, which leads to the consumption of longer time. In addition, the above-described white balance methodology requires to identify and record the white points in the entire image so as to compute the white point color correction coefficient. This will explicitly indicate that a larger memory space is needed to store considerable computational data, and on the other hand, this will implicitly indicate that the work loading of hardware integrated circuit will increase due to enormous computation quantity.

SUMMARY OF THE INVENTION

The main object of the present invention is to provide an automatic white balance correction method for an image capturing apparatus, wherein the automatic white balance correction method of the present invention uses gray point searching in place of white point searching and performs color correction to the captured color image through the gray points, so as to obtain an optimum white balance effect.

Another object of the present invention is to provide an automatic white balance correction method with minimum storage memory space, minimum image-searching iteration and minimum computation quantity.

Another further object of the present invention is to provide an automatic white balance correction method for an image capturing apparatus, which computes color correction coefficient sets for each gray points so as to be implemented in hardware wiring and suitable for simple software design.

To accomplish the foregoing objects, the present invention utilizes an image capturing apparatus to capture a color image. The pixel component of the color image will be determined if it is a gray point at the time it is captured, and compute the color correction coefficients of each color components of each gray points respectively. The color correction coefficients are then averaged to generate a color correction average value set. A color correction process is then performed to each pixel of the color image according to the color correction average value set. It is remarkable that the present invention is not necessary to determine the brightest gray points as white points in the present color image frame, instead, the present invention directly computes the color correction coefficients of each gray point that are likely to be determined as white points, so that the image-searching process can be significantly simplified.

The other objects, features and advantages of the present invention will become more apparent through the following descriptions with reference to the accompanying drawings, wherein:

DETAILED DESCRIPTION OF THE PREFERRED EMBODIMENT

The present invention is distinct from the conventional art in terms of the utilization of gray point searching instead of white point searching, and performs color correction to the image seized from the image capturing apparatus through the use of color correction coefficient sets being computed based on these gray points. Therefore, the most appropriate white balance for the color image can be obtained.

Figure 1:
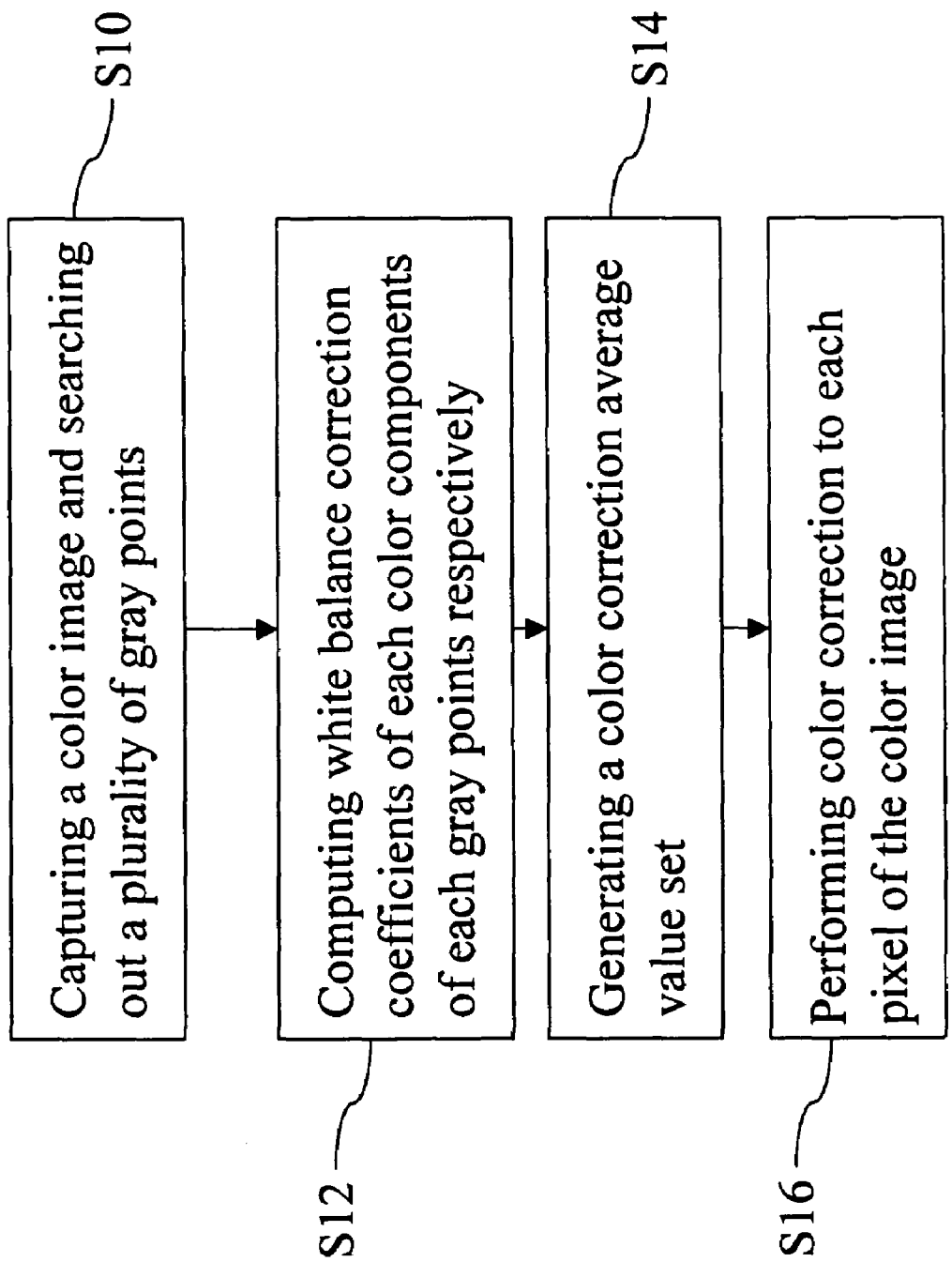
FIG. 1 shows a flow chart illustrating the white balance correction method through the use of gray points according to a preferred embodiment of the present invention.

FIG. 1 shows a flow chart illustrating the white balance correction method through the use of gray points according to a preferred embodiment of the present invention. First, please refer to FIG. 1 in which a color image capturing apparatus, such as a charge-coupled device (CCD) image sensor or a CMOS image sensor, is utilized to capture a color image, and define gray points in RGB or YUV color space so as to search a plurality of gray points in the captured color image.

Next at step S12, the white balance correction coefficients of each color component of each gray point are computed respectively, such that each gray point has a correction coefficient set. Next at step S14 the correction coefficient sets of all the gray points are averaged to generate a color correction average value set. Color correction is performed, to each pixel in the captured color image in RGB color space or YUV color space according to the color correction average value set. In this way, the color deviation resulting from external source light can be corrected under various conditions and the most appropriate white balance correction can be calculated, so that the hue and tinge of white color can be actually displayed under all conditions.

In particular, three color components of the color-corrected pixel will satisfy the following equations after automatic white balance correction, $Rc=Gc=Bc$, and the luminance of color image before color correction is identical to the luminance of color image after color correction.

Up to now, the principles of automatic white balance correction method according to the present invention have been fully described, it is particularly intended to give an exemplarily preferred embodiment to explicate the foregoing theorems, in order that the technicians skilled in the art can acquire sufficient knowledge to implement the present invention accordingly with reference to the descriptions of this exemplarily preferred embodiment.

Figure 2:
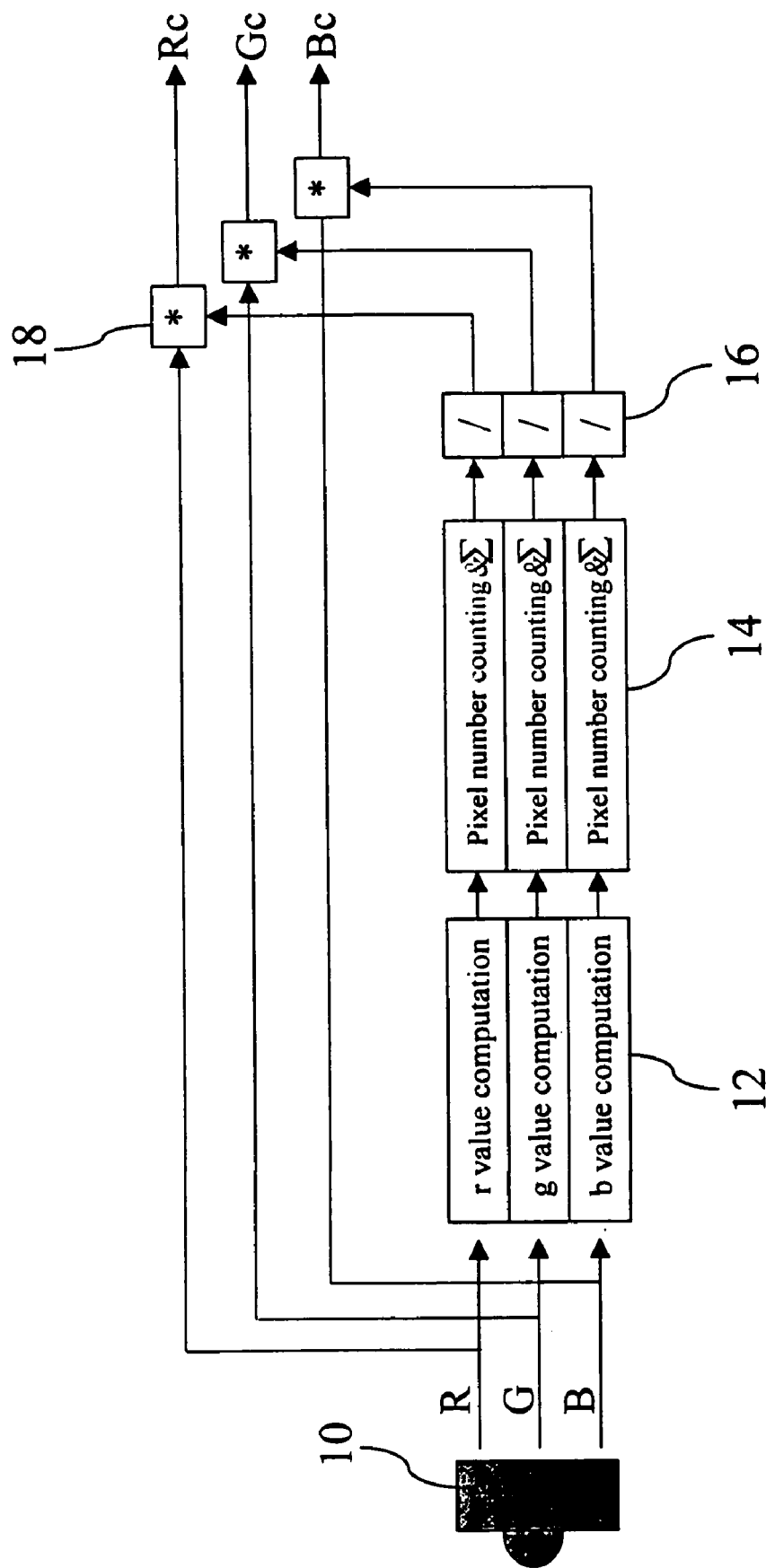
FIG. 2 is a structural view schematically illustrating white balance correction method according to a preferred embodiment of the present invention.

As shown in FIG. 2, a color image capturing apparatus 10 is used to capture a color image. After searching out a plurality of gray points, a counter 12 is used to compute the red color, green color and blue color component values of each pixel of the plurality of gray points, thereby determining if they satisfy the criteria of gray point condition. The criteria of gray point condition includes:

(a) ($|G-B|<Bt$) and ($|G-R|<Rt$), where Bt represents the threshold value of blue color, and Rt represents the threshold value of red color; and (b) $G>Gt$, where Gt represents the threshold value of green color.

Besides, an alternative definition of the gray point condition can be obtained through the following criteria:

(c) The maximum value of ($|G-B|$, $|G-R|$, $|R-B|$)$\leq$ or $<$Color Threshold; and (d) $G \geq$ or $>Gt$, where Gt represents the threshold value of green color.

If the pixel components satisfying both criteria (a) and (b) will be determined as gray points. Similarly, the pixel components satisfying both criteria (c) and (d) will be also determined as gray points. If the pixel element only satisfies criterion (c), it may also be defined as a gray point.

After obtaining a plurality of gray points that satisfy the criteria of gray point condition, a processor 14 is used to compute the color correction coefficients of red color, green color and blue color components of these gray points respectively and performs color addition. The computation of color correction coefficients is carried out by means of the following equations:

$Y = a \times R + b \times G + c \times B$, where $a+b+c=1.0$ $Yc = aa \times Rc + bb \times Gc + cc \times Bc$, where $aa+bb+cc=1.0$ $Rc = r \times R$, $Gc = g \times G$, $Bc = b \times B$ and since (Y=Yc) & (Rc=Gc=Bc), then $r = Yc/((aa+bb+cc) \times R) = Y/R$ $g = Yc/((aa+bb+cc) \times G) = Y/G$ $b = Yc/((aa+bb+cc) \times B) = Y/B$ Consequently, the color correction coefficient set of each gray pixel component is (r,g,b).

Next, a divider 16 is utilized to average the color correction coefficient sets of all gray points and generate a color correction average value set. Finally, a multiplier 18 performs color correction to each pixel component of the color image by performing computation with the color correction average value set together with original RGB color values, and further outputs corrected RGB color values. In this manner, the purpose of automatic white balance is achieved. In other words, the divider 16 and the multiplier 18 perform white balance computation in a fashion as defined in the following equations:

$r\_av=(\Sigma r)/N$, $b\_av=(\Sigma b)/N$ and $g\_av=(\Sigma g)/N$, where N is the number of captured gray points; then $Rc=r\_av \times R$, $Gc=g\_av \times G$, $Bc=b\_av \times B$. Thus, the three original color components of each gray pixel can be determined.

In addition to the above gray point conditions that are dominated by green color component, there are other gray point conditions, for example, ($|R-B|<Bt$) and ($|R-G|<Gt$), and $R>Rt$; or ($|B-R|<Rt$) and ($|B-G|<Gt$), and $B>Bt$. Briefly summarized, the gray point condition must comply with the criteria of: an absolute differential value of the first color component and the second color component is less than a threshold value of the second color component, an absolute differential value of the first color component and the third color component is less than a threshold value of the third color component, and the first color component value is greater than a threshold value of the first color component.

Figure 3:
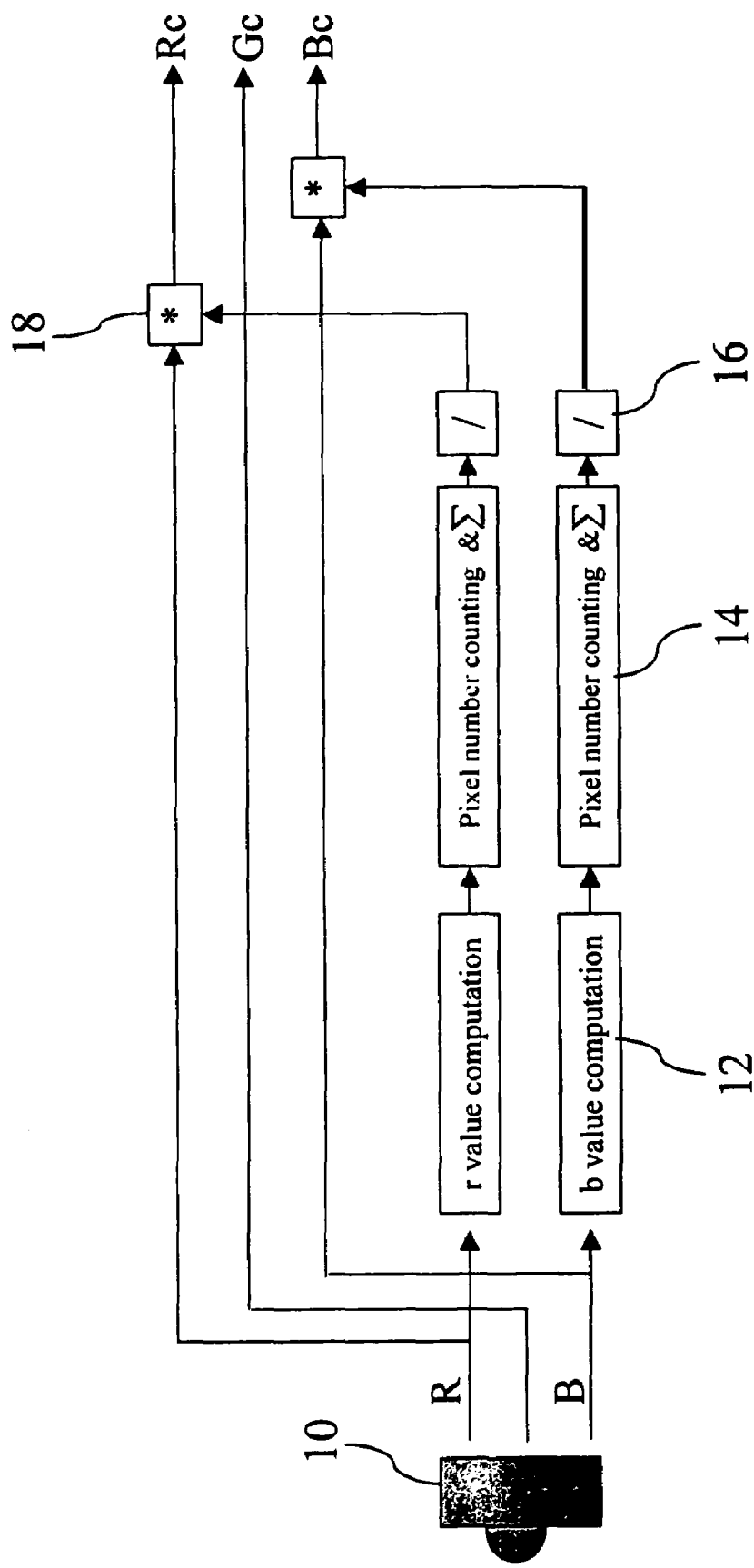
FIG. 3 is a structural view schematically illustrating white balance correction method according to another preferred embodiment of the present invention.

Another preferred embodiment of the present invention is diagrammatically illustrated by way of FIG. 3, wherein the color correction coefficients of the red color and blue color components are computed only. The computation of the color correction coefficients in this preferred embodiment is accomplished by the formulas of $r=G/R$ and $b=G/B$, so that the color correction coefficient set of each gray pixel component is (r,b). Next, while the white balance computation is performing after the color correction coefficient set is obtained, the computation algorithm for performing white balance correction is in reference to the following formulas:

$r\_av=(\Sigma r)/N$, $b\_av=(\Sigma b)/N$, where N is the number of captured gray points, then $Rc=r\_av \times R$, $Gc=G$, $Bc=b\_av \times B$, so as to compute the three original color components of each gray point. It is noteworthy that the present preferred embodiment is similar to the previous preferred embodiment except for the computation of red color and blue color components, and it is not intended to give other irrelevant details herein.

Furthermore, if the present invention desires to accomplish gray point searching or color correction in YUV color space, the gray point should meet the criteria of: an absolute value of a color component must be less than a threshold value of its color component, and an absolute value of another color component must be less than a threshold value of its color component. That is to say, the absolute value of chroma Cb (V) color component is less than the threshold value of the chroma Cb (V) color component and the chroma Cr (U) color component is less than the threshold value of the chroma Cr (U) color component. The absolute value and the threshold value of Y color component do not need to compute, they can be computed by performing inverse operations to RGB or RB. The computation algorithm is arranged as follows:

$$R = y1 \times Y + u1 \times U + v1 \times V$$

$$G = y2 \times Y + u2 \times U + v2 \times V$$

$$B = y3 \times Y + u3 \times U + v3 \times V$$

The automatic white balance correction method through the use of gray points to perform color correction according to the preset invention has the following advantages:

1. The automatic white balance correction method using white point searching according to the conventional art requires to search out the brightest pixel component in the color image as white points. By contrast, the present invention uses gray point searching in place of white point searching, which can eliminate the process of searching the entire color image for once. As a result, the conventional automatic white balance correction method requires to perform global searching to the entire color image for three times, while the present invention requires to perform global searching to the entire color image twice only. It is evident from the above statements that the present invention is more time-saving and can reduce the times of image-searching iteration.

2. In the conventional art, it is essential to identify and record white points, so that color addition can be performed to the defined white points in the second image-searching process. However, the present invention actually does not need this sophisticated process, so that the storage memory space can be saved.

3. If we use white point searching to perform white balance correction, the number of captured pixels is not as many as using gray points. Therefore, gray point searching can be used to provide a color average value with more accuracy.

4. The automatic white balance correction method of the present invention computes color correction coefficient set for each gray points. Because the determination of gray point is relative to the color of this pixel component only, the information of the entire color image is not necessary. Once the color of pixel component is determined as a gray point, it will be immediately transferred to next stage of hardware integrated circuit or next software program to compute color correction coefficients. Thus, the automatic white balance correction method of the present invention is suitable for pipeline hardware architecture or simplified software design.

5. The pixel luminance can be maintained constant if we perform color correction to red color, green color and blue color components simultaneously.

According to the present invention, it is not necessary to determine what are the brightest gray points in the color image as white points, instead, the present invention directly computes the color correction coefficients of each gray points that are likely to be determined as white points, so that the image-search process can be simplified. It is obvious that the present invention provides a devisal of automatic white balance correction method with minimum design cost, minimum storage memory space, minimum times of image-searching iteration and minimum computation quantity.

Although the present invention has been described and illustrated in detail, it is to be clearly understood that the same is by the way of illustration and example only and is not to be taken by way of limitation, the spirit and scope of the present invention being limited only by the terms of the appended claims.

What is claimed is:

1. An automatic white balance correction method for an image capturing apparatus, comprising the steps of: capturing a color image by an image capturing apparatus and initiating a gray point searching; computing color correction coefficient sets of each color components of each gray points in the color image respectively; averaging color correction coefficient sets of the gray points of the color image and generating a color correction average value set; and performing color correction according to the color correction average value set to each pixel of the color image.

2. The automatic white balance correction method according to claim 1 wherein the gray point searching comprising defining gray points in a RGB color space or a YUV color space.

3. The automatic white balance correction method according to claim 2 wherein color values of the YUV color space are computed from color values of the RGB color space.

4. The automatic white balance correction method according to claim 1 wherein a luminance of the color image before color correction is identical to a luminance of the color image after color correction.

5. The automatic white balance correction method according to claim 1 wherein each gray point is comprised of a first color component, a second color component, and a third color component.

6. The automatic white balance correction method according to claim 5 wherein each of the first color component value, the second color component value, and the third color component value is an arbitrary combination of a red color value, a green color value, and a blue color value.

7. The automatic white balance correction method according to claim 5 wherein each of the first color component value, the second color component value, and the third color component value is an arbitrary combination of a chroma red color (Y) value, a chroma green color (U) value, and a chroma blue color (V) value.

8. The automatic white balance correction method according to claim 5 wherein the gray points are satisfied with the criteria of: an absolute value of a color difference between of the first color component and the second color component is less than a threshold value, and an differential value of a color difference between the first color component and the third color component is less than another threshold value.

9. The automatic white balance correction method according to claim 8 wherein the gray points are further satisfied with a criterion of that a first color component value is greater than or equal to a threshold value.

10. The automatic white balance correction method according to claim 5 wherein the gray points are satisfied with the criterion of: a maximum among an absolute value of a color difference between the first color component and the second color component, an absolute value of a color difference between the second color component and the third color component, and an absolute value of a color difference between the first color component and the third color component is less than or equal to the threshold value.

11. The automatic white balance correction method according to claim 5 wherein the gray points are satisfied with a criterion of that a first color component value is greater than or equal to a threshold value.

12. The automatic white balance correction method according to claim 5 wherein the gray points are satisfied with the criteria of: an absolute value of the first color component is less than a threshold value, and an absolute value of the second color component is less than another threshold value.

* * * * *